(No Model.)
A. SNOECK.
DEPTH GAGE.
No. 490,860.                    Patented Jan. 31, 1893.
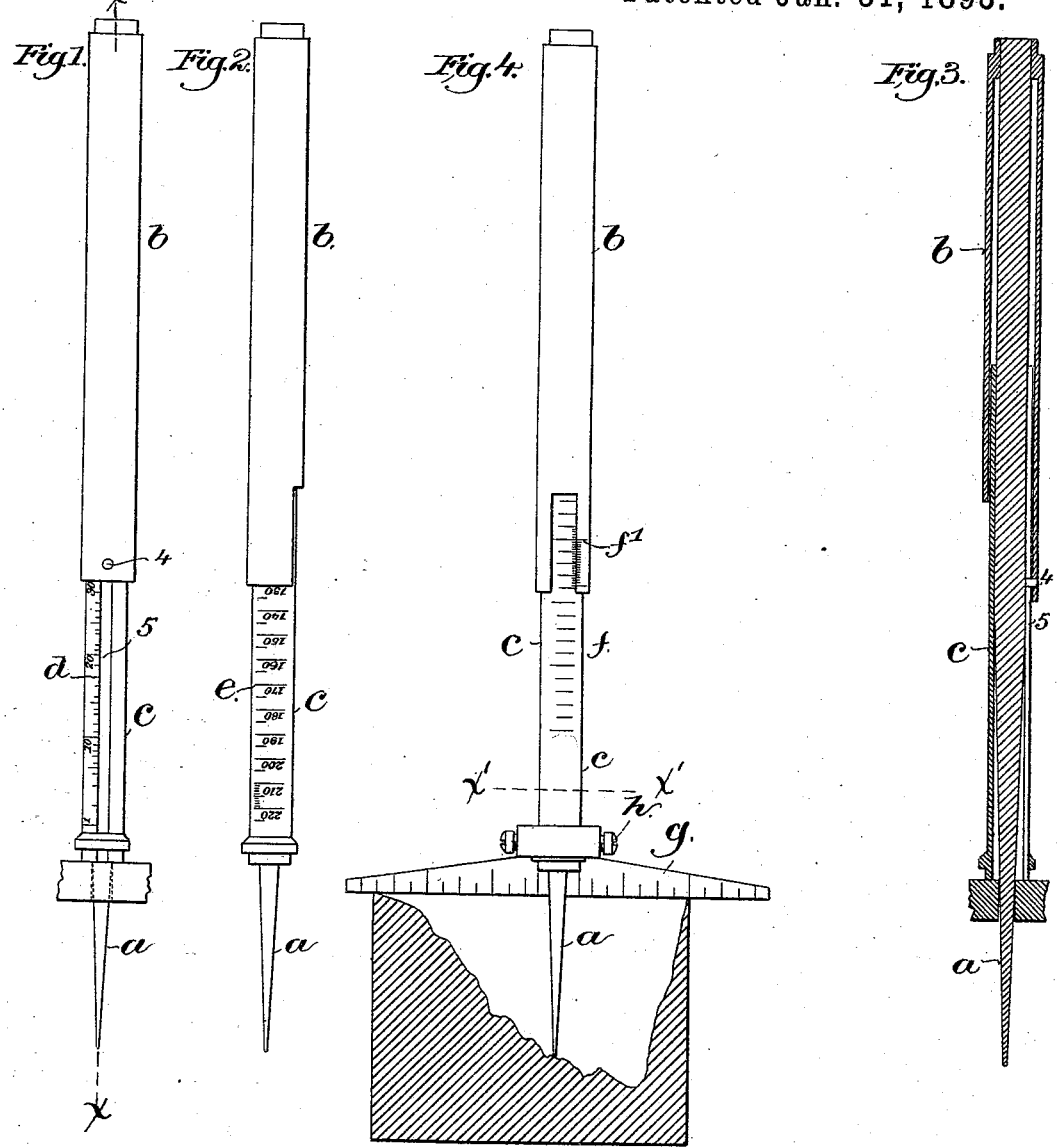
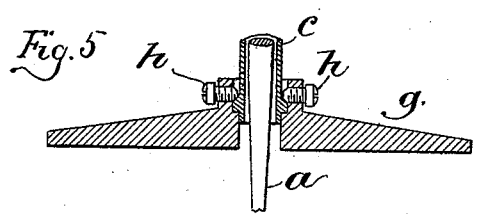
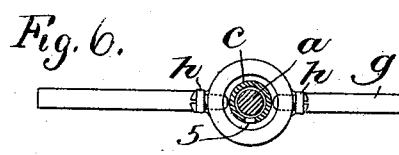

UNITED STATES PATENT OFFICE.

ALBERT SNOECK, OF ENSIVAL, BELGIUM.

DEPTH-GAGE.

SPECIFICATION forming part of Letters Patent No. 490,860, dated January 31, 1893.

Application filed February 29, 1892. Serial No. 423,262. (No model.)

*To all whom it may concern:*

Be it known that I, ALBERT SNOECK, a subject of the King of Belgium, residing at Ensival, Province of Liege, Belgium, have invented an Improvement in Gages, of which the following description, in connection with the accompanying drawings, is a specification, like letters on the drawings representing like parts.

This invention has for its object the production of a novel gage by which to readily ascertain the diameter of holes, the instrument as made being also available for use in measuring the depth of a hole or cavity, or the depths of different parts of a hole or cavity of unequal depth.

The tool to be described consists essentially of a tapering spindle and a co-operating sliding index provided with suitable scale marks to designate the standard twist drill gage, or to designate fractions of an inch, as for instance, thousandths of an inch, the index containing one or both these scale marks, or it may be any other suitable or desired scale marks.

Figure 1, in elevation shows one of my improved tools as applied to a piece of metal having a hole the diameter of which is to be measured, the scale shown indicating the standard twist drill gage. Fig. 2, is a like view but with another part of the tube in front, to show a different scale of indicating diameters in thousandths of an inch. Fig. 3, is a longitudinal section of the tool in the line $x, x$, Fig. 1. Fig. 4, is yet another view of the tool with a yoke added for a purpose to be described. Fig. 5, is a detail showing the yoke in section and the means employed to attach it to the tool; and Fig. 6, a section below the dotted line $x', x'$ Fig. 4.

The tapering spindle $a$, to enter the hole the diameter or depth of which is to be measured, has for greatest convenience a handle or hand-piece $b$, the handle being shown as a sleeve attached at its outer end to the outer end of the spindle in such manner as to leave a space into which may enter the sliding index $c$, made as a tube having a sliding fit on the spindle, the index being in this instance of my invention shown as provided with three sets of scales, viz:—one set as $d$, Fig. 1, suitably divided or spaced to correspond with and indicate the standard twist drill gage; a second scale $e$, to designate a one-thousandth of an inch in diameter; and a third scale to indicate a one-thousandth of an inch in depth.

My invention is, however, of great practical value with only the twist drill gage marked on the index, and it is obvious that I may employ on the index any desired scale marks without departing from my invention.

In the use of my invention, as shown in Fig. 1, the operator with the hand-piece in his hand will push the end of the index against the work having the hole the diameter of which is to be measured, and will push on the hand-piece until the tapering part of the spindle fits the hole the diameter of which is to be measured. In this condition the marks on the scale $d$ at or in line with the inner end of the hand-piece will designate the number of the twist drill gage, and at the same time the marks comprising the scale $e$, a little farther around on the index will designate in one-thousandths of an inch, the diameter of the holes being measured.

If it is desired to measure the depth of a hole the end of the spindle will be pushed into the hole while the end of the index rests at the mouth of the hole, and the bottom of the hole having been felt by the point of the spindle this depth will be designated by the scale $f$. In reading the latter scale the mark $f'$ on the hand-piece $b$ is the reading line. The division of the scale $f$ indicates one-fiftieth of an inch, and to enable the operator to ascertain the one-thousandth of an inch in depth, I have provided the hand-piece with a series of marks below the mark $f'$, constituting a vernier scale thus adapting the tool to micrometer measurements. Now if it should be desired to ascertain the depth at any point of a hole having an irregular bottom, then I apply to the index $c$, a yoke $g$ to span or bridge the mouth of the hole, and support the index so that the spindle may be readily pushed down into the hole at the point to be measured. This bridge is provided with a scale, as shown in Fig. 4, to indicate the distance from the side of the hole at which the depth measurement indicated by the scale $f$ is found. The yoke is shown as applied to the index by screws $h$. The hand-piece $b$, as shown best in Figs. 1 and 3, has a pin 4 which enters a slot in the sliding scale or movable index c, to thus prevent the rotation of the spindle and scale one with relation to the other.

Having described my invention, what I claim and desire to secure by Letters Patent, is:—

1. A tool to measure the diameter of holes, it consisting of a tapering spindle and an index provided with a scale, the said parts being longitudinally movable one with relation to the other, substantially as described.

2. The tapering spindle and its hand-piece, combined with a movable index having a scale extended longitudinally thereon and adapted to slide longitudinally on the spindle and between it and the hand-piece, substantially as described.

3. The tapering spindle, and its hand-piece having a scale, combined with a movable index c having a scale extended the length thereof and adapted to slide on the spindle between it and the hand-piece, the outer end of the index forming the base or rest for the tool, the scale on the hand-piece being arranged parallel to and co-operating with the scale on the index c at any point thereof, and constituting a vernier or micrometer, substantially as described.

4. The spindle, and an index co-operating therewith, provided with a scale the said parts being longitudinally movable one with relation to the other, combined with a yoke supporting the index and having a lateral scale whereby the depth of a hole may be indicated at any distance from its side wall, substantially as described.

In testimony whereof I have signed my name to this specification in the presence of two subscribing witnesses.

ALBERT SNOECK.

Witnesses:
FREDERICK L. EMERY,
FRANCES M. NOBLE.